(No Model.)

I. H. DAVIS.
PRESSURE VARIATION INDICATOR.

No. 540,541.  Patented June 4, 1895.

WITNESSES:
N. R. Washburn
A. D. Harmon

INVENTOR
Isaac H. Davis
by Hugh H. Brown & Quinby
Attys.

UNITED STATES PATENT OFFICE.

ISAAC H. DAVIS, OF BOSTON, MASSACHUSETTS.

PRESSURE-VARIATION INDICATOR.

SPECIFICATION forming part of Letters Patent No. 540,541, dated June 4, 1895.

Application filed January 3, 1895. Serial No. 533,742. (No model.)

*To all whom it may concern:*

Be it known that I, ISAAC H. DAVIS, of Boston, in the county of Suffolk and State of Massachusetts, have invented certain new and useful Improvements in Pressure-Variation Indicators, of which the following is a specification.

This invention relates to pressure-variation indicators in which variations of pressure of a fluid, and particularly steam, act upon a pointer which revolves over a dial. It is well known that the function of the ordinary type of pressure-gage is limited to indicating the degree of pressure or vacuum which its pointer shows on the dial. It does not show the rapidity with which the change of pressure is momentarily varying, the path in which the pointer moves being necessarily limited by the diameter of the dial, so that the movements or fluctuations of the pointer caused by variations of pressure are necessarily so slight that they are not perceptible to the eye at a momentary glance. It is therefore necessary for the observer to remember a previously-observed position of the pointer, in order to determine whether the pressure is rising or falling.

The object of my invention is to provide a pressure variation indicator which will determine instantly whether the pressure is rising or falling, and also to determine the rapidity of such change.

To this end, the invention consists in the improvements which I will now proceed to describe and claim.

Figure 1:
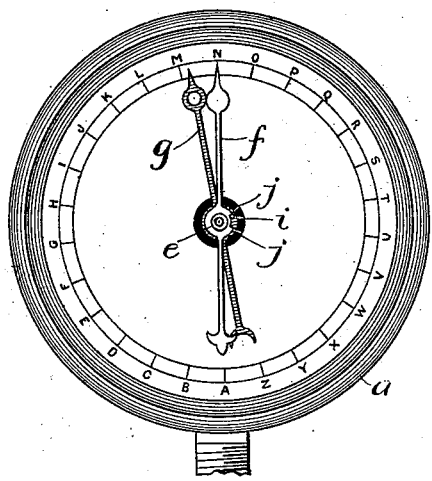
Figure 2:
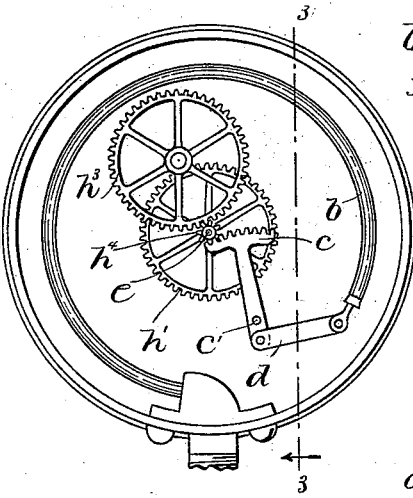
Figure 3:
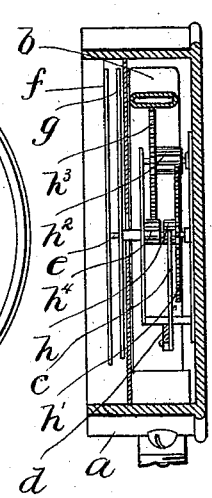
Figure 4:
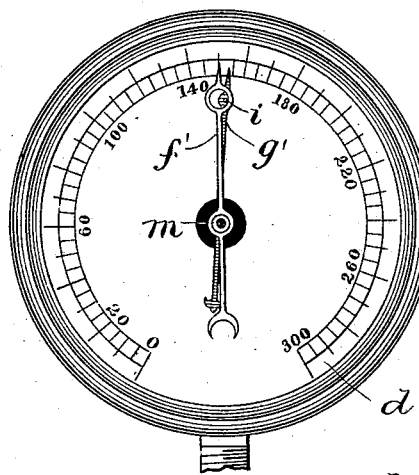
Figure 5:
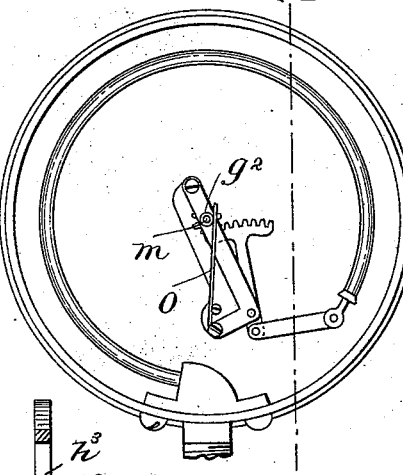
Figure 6:
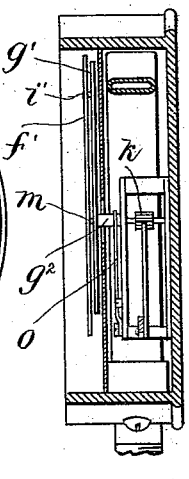
Figure 7:
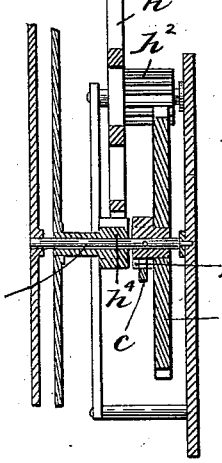

Of the accompanying drawings, forming a part of this specification, Figure 1 represents a front view of a pressure-gage embodying my invention. Fig. 2 represents a similar view, the dial and pointers being removed. Fig. 3 represents a section on line 3 3 of Fig. 2. Figs. 4, 5, and 6 represent views of another embodiment of my invention. Fig. 7 represents an enlarged vertical section taken through the arbor or shaft and the parts mounted thereon shown in Fig. 2.

In Figs. 1, 2, and 3, $a$ represents the case of the pressure-variation indicator, which is provided with suitable pressure-actuated means for converting pressure into rotary motion, the preferred means being the usual Bourdon spring $b$ and the toothed sector $c$ pivoted at $c'$ to the casing and connected by a link $d$ to the free end of the spring. An arbor or shaft $e$ is supported by the case and dial, said arbor supporting the pointers $f\,g$ and parts of the mechanism hereinafter described, which multiplies the motion imparted by the sector and communicates the multiplied motion to the pointer $f$. Said multiplying mechanism, as here shown, comprises a pinion $h$ loose upon the arbor and meshing with the segment $c$, a gear $h'$ affixed to said pinion, a pinion $h^2$ meshing with the gear $h'$ and mounted on an arbor journaled in bearings in the casing, a gear $h^3$ affixed to the pinion $h^2$, and a pinion $h^4$ affixed to the arbor $e$ and meshing with the gear $h^3$. The arbor $e$ receives the multiplied motion imparted from the sector, so that any movement of the sector is largely magnified, as it were, by the pointer $f$ affixed to said arbor, the change of pressure causing such movement being therefore apparent to the observer at a glance. The hub of the pointer $g$ is loosely mounted on the arbor $e$, and said pointer is loosely connected with the pointer $f$, so that it is dragged along by the pointer $f$, which I term the primary pointer, the other being the auxiliary pointer. The loose connection between the two pointers is preferably effected by means of a pin $i$ affixed to the auxiliary pointer and two stops or abutments $j\,j$ on the primary pointer at opposite sides of said pin, said stops being the ends of a recess formed in the primary pointer. It will be seen that when the primary pointer is moved progressively in either direction, the auxiliary pointer is moved or dragged after it by the described connection. There is, however, a sufficient lost motion between the pin $i$ and stops $j\,j$ to cause the auxiliary pointer to stand at a considerable angle to the primary pointer when moving with it, the auxiliary pointer standing at one side of the primary pointer when the pressure is rising, and at the opposite side when the pressure is decreasing. The relative positions of the pointers are therefore a clear and easily perceived indication of the character of the change of pressure that is taking place.

When the movement of the primary pointer is reversed, the auxiliary pointer remains stationary until the primary pointer has passed across it in the opposite direction. Hence a change in the angle formed by the two pointers immediately occurs when the movement of the primary pointer is reversed, this change being of such nature that it may be quickly perceived by the observer. I prefer to provide a brake or friction device to prevent movement of the auxiliary pointer while the primary pointer is moving independently after a reversal of its movement; and said friction device may be a spring attached to the casing and bearing upon the hub of the auxiliary pointer.

It will be seen that the multiplying mechanism causes the primary pointer to indicate at a glance when a change of pressure is occurring, and that the two pointers act conjointly to indicate the character of the change. The auxiliary pointer is also useful in quickly indicating by the variation in the angle formed by the two pointers upon a reversal of the movement of the primary pointer. Without the auxiliary pointer, such reversal could not be so quickly observed, the movement of the primary pointer being necessarily slow when the reversal commences.

The construction above described is intended particularly to be used as an auxiliary or supplemental indicator, affording quick information as to changes of pressure, but not serving the purpose of the ordinary pressure-gage in indicating the degree of pressure. It will therefore be generally used with or beside an ordinary pressure-gage, although if desired both gages may be embodied in one case. In other words, a single gage may comprise the ordinary pressure-actuated mechanism and a slow-moving pointer moved thereby over the dial to indicate the degree of pressure, and another pressure-actuated mechanism having multiplying gearing and a pointer receiving a relatively quick movement therefrom. My invention may, however, be embodied in an indicator having no multiplying mechanism, the primary pointer co-operating as usual with the dial in indicating the degree of pressure. Such embodiment is shown in Figs. 4, 5, and 6, in which the sector $c$ is shown as meshing with a pinion $k$ affixed to the shaft $m$ to which the primary pointer $f'$ is affixed, this being a common means of actuating a gage-pointer. The auxiliary pointer $g'$ has its hub $g^2$ mounted loosely on the shaft $m$, and is loosely connected to the primary pointer by means of a pin $i'$ on the auxiliary pointer entering an orifice in the primary pointer, the sides of said orifice constituting stops or abutments between which and the pin there is sufficient lost motion to permit the auxiliary pointer to follow the primary pointer at an angle therewith. The two pointers therefore show the observer at a glance whether the pressure is rising or falling, and afford a reasonably quick indication of a reversal of the movement of the primary pointer. The friction device or brake previously mentioned for preventing movement of the auxiliary pointer by its own weight is shown in Figs. 5 and 6 as a spring $o$ attached at one end to a support in the casing and bearing at its other end on the hub of the auxiliary pointer.

The last-described embodiment of my invention may be produced by adding to the mechanism of an ordinary pressure-gage the auxiliary pointer and its brake or friction device, no other change being required.

My improvement is applicable to a gage for indicating any kind of pressure, and I do not confine it to any special purpose. In its application to the steam boiler, it offers this advantage,—that under the varying conditions under which boilers are fired, depending upon the character of the work in which they are employed, the changes of pressure both as to rate and direction can be instantly detected. In many lines of industry, no arbitrary pressure is maintained on the boiler, as the demands for steam are very irregular. This is notable in the manufacture of paper, and in the iron, chemical, and other industries. In other lines, such as spinning, &c., a fixed pressure is used and the demands for steam are quite regular.

In the firing of the boiler, more especially when great and sudden demands for steam are made, great judgment and skill are required on the part of the fireman to handle the fires in reference to this irregular demand for steam, and it is quite important that he should know instantly by mere observation, whether his steam pressure is rising or falling; that is, whether the volume of steam in his boiler is increasing or decreasing, in order that he may use the necessary judgment as to what course to pursue in replenishing his furnace with coal, his boiler with water, or in dressing his fires. When the ordinary steam-gage is used, he is compelled to tax his memory as to the position of the pointer in reference to the marks on his dial when he last saw it. If the interval of time should be long, he often fails to know whether the amount of steam in the boiler is increasing or decreasing, and is liable to perform work in connection with the furnace the reverse of what he would have done had he known the proper condition of action of the steam in his boiler.

It will be seen that my improvement enables the fireman to instantly determine the proper action to take, and therefore to the more intelligently handle the fire, the result being a saving of coal and the maintenance of the proper volume of steam in the boiler.

My invention is useful in connection with lines of industry where a fixed or arbitrary pressure is maintained. Suppose, for example, that the fireman is instructed to keep the steam pressure of his boiler at eighty pounds, and that an inspection of the gage informs him that the pressure has fallen to seventy-five pounds, or has risen to eighty-five pounds. It is obvious that the gage gives only the information that the pressure has fallen or has risen, and does not instantaneously inform the observer whether the pressure is still rising or still falling. This information, which my improved variation indicator furnishes, is very important, as it enables the fireman to intelligently handle his fire, so that he may avoid an increase of fire if he finds that the pressure although below the predetermined degree is actually rising, and may increase the fire if he finds that the pressure is still falling.

In most mills where fixed pressures are used, there are liable to be momentary demands for steam, which if the fires are in bad condition cause the pressure to fall a few pounds. The fireman never knows by looking at the gage, unless it is watched very closely, whether the steam is actually rising or falling, and merely knows that the steam has risen or fallen in the interval of time since he previously looked at the gage. When fixed pressures are used, it is often the case that the boiler capacity is too small for the power of the engine, and requires constant watching and intelligent handling of the fire on the part of the fireman to maintain the steam at a fixed pressure.

I claim—

1. A pressure-variation indicator comprising a primary pointer, suitable pressure-actuated means for imparting motion thereto, and an auxiliary pointer loosely connected with the primary pointer and adapted to trail behind the same when the primary pointer is moving progressively, the loose connection permitting a change in the relative positions of the two pointers when the movement of the primary pointer is reversed.

2. A pressure-variation indicator comprising a primary pointer, suitable pressure-actuated means for imparting motion thereto, an auxiliary pointer loosely connected with the primary pointer and adapted to trail behind the same when the primary pointer is moving progressively, and a friction device or brake whereby the auxiliary pointer is held stationary during the initial part of a reverse movement of the primary pointer.

3. A pressure-variation indicator comprising a primary pointer, suitable pressure-actuated means including a rotary shaft or arbor for imparting motion to said pointer, an auxiliary pointer having its hub mounted loosely on said shaft or arbor, a pin or projection on one pointer located between two stops or abutments on the other, and a friction device or brake bearing on the hub of the auxiliary pointer.

4. In a pressure-variation indicator, the combination with suitable pressure-actuated mechanism, such as a spring and a sector connected therewith and a revoluble pointer adjacent thereto, of intermediate multiplying gearing connecting the said mechanism and pointer, whereby ordinary variations of pressure are caused to give the pointer an instantaneously visible movement, and an auxiliary pointer loosely connected with the primary pointer and adapted to trail behind the same when the primary pointer is moving progressively.

In testimony whereof I have signed my name to this specification, in the presence of two subscribing witnesses, this 26th day of December, A. D. 1894.

ISAAC H. DAVIS.

Witnesses:
N. R. WASHBURNE,
E. BATCHELDER.